(12) United States Patent
Schulz et al.

(10) Patent No.: US 11,654,804 B2
(45) Date of Patent: May 23, 2023

(54) TRIM COVER ATTACHMENT WITH FAUX HOLE DESIGN

(71) Applicant: LEAR CORPORATION, Southfield, MI (US)

(72) Inventors: Laura Schulz, Bloomfield Hills, MI (US); William Paruszkiewicz, Clinton Township, MI (US); Benedict Messina, Warren, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/555,697

(22) Filed: Dec. 20, 2021

(65) Prior Publication Data
US 2022/0227272 A1    Jul. 21, 2022

Related U.S. Application Data

(60) Provisional application No. 63/138,081, filed on Jan. 15, 2021.

(51) Int. Cl.
*B60N 2/58* (2006.01)
(52) U.S. Cl.
CPC .................................. *B60N 2/5833* (2013.01)
(58) Field of Classification Search
CPC ...... B60N 2/60; B60N 2/6018; B60N 2/6036; B60N 2/5825; B60N 2/5833

USPC ............................................ 297/218.1, 218.3
See application file for complete search history.

(56) References Cited

U.S. PATENT DOCUMENTS

| | | | |
|---|---|---|---|
| 7,703,855 B1 | 4/2010 | Kalinowski | |
| 7,857,383 B2 | 12/2010 | Nguyen et al. | |
| 10,358,064 B2 | 7/2019 | Nishino et al. | |
| 2010/0148551 A1* | 6/2010 | Nguyen | B60N 2/5825 297/218.3 |
| 2018/0111529 A1* | 4/2018 | Taguchi | B60N 2/5816 |
| 2019/0031062 A1* | 1/2019 | Suzuki | B60N 2/5883 |
| 2023/0009334 A1* | 1/2023 | Akutsu | B60N 2/72 |

* cited by examiner

*Primary Examiner* — Sarah B McPartlin
(74) *Attorney, Agent, or Firm* — Brooks Kushman P.C.

(57) ABSTRACT

A vehicle seat includes a seat frame including a frame component and a seat pad supported by the seat frame, with the seat pad defining an opening therethrough such that the seat frame is accessible via the opening. The vehicle seat also includes a trim cover assembly disposed over the seat pad. The trim cover assembly includes a trim cover having a flap portion sized to extend through the opening in the seat pad with a first fastener, and a securing flap having a retainer secured thereon. The securing flap includes a second fastener cooperable with the first fastener. The retainer is connected to the frame component to attach the securing flap to the seat frame, and the flap portion is positioned through the opening and connected to the securing flap via the first and second fasteners to define a faux hole.

20 Claims, 4 Drawing Sheets

TRIM COVER ATTACHMENT WITH FAUX HOLE DESIGN

CROSS-REFERENCE TO RELATED APPLICATIONS

This application claims the benefit of U.S. provisional application Ser. No. 63/138,081 filed Jan. 15, 2021, the disclosure of which is hereby incorporated in its entirety by reference herein.

TECHNICAL FIELD

The present application is directed to a vehicle seating assembly, and more particularly, a trim cover attachment to form an aesthetic feature.

BACKGROUND

Vehicle seats having seat bottoms and seat backs typically include foam cushions positioned on a seat frame to provide support to vehicle occupants. The cushions include a trim cover disposed thereon to provide an aesthetically pleasing appearance for the occupant support surface. The seats may include various fixtures for attaching trim covers to the seat frame, and may include particular features to form design elements in the occupant support surface.

SUMMARY

According to at least one embodiment, a vehicle seat assembly includes a seat frame including a frame component and a seat pad supported by the seat frame. The seat pad defines an opening therethrough such that the seat frame is accessible via the opening. A trim cover assembly is disposed over the seat pad, with the trim cover assembly including a trim cover. The trim cover has a flap portion sized to extend through the opening in the seat pad, and the flap portion includes a first fastener. The trim cover also includes a retainer with a second fastener cooperable with the first fastener, with the retainer being cooperable with the frame component. The retainer is engaged with the frame component with the flap portion secured to the retainer to attach the trim cover and define a faux hole in an occupant surface of a vehicle seat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

According to embodiments of the present disclosure, a trim cover assembly for a vehicle seat cushion is provided. The trim cover assembly includes a trim cover with a flap portion which extends through an opening (e.g., a slit) in a foam pad of the seat back cushion. The flap portion is secured on a retainer to the seat frame such that the trim cover shows a faux-hole design in the seat back cushion.

Figure 1:
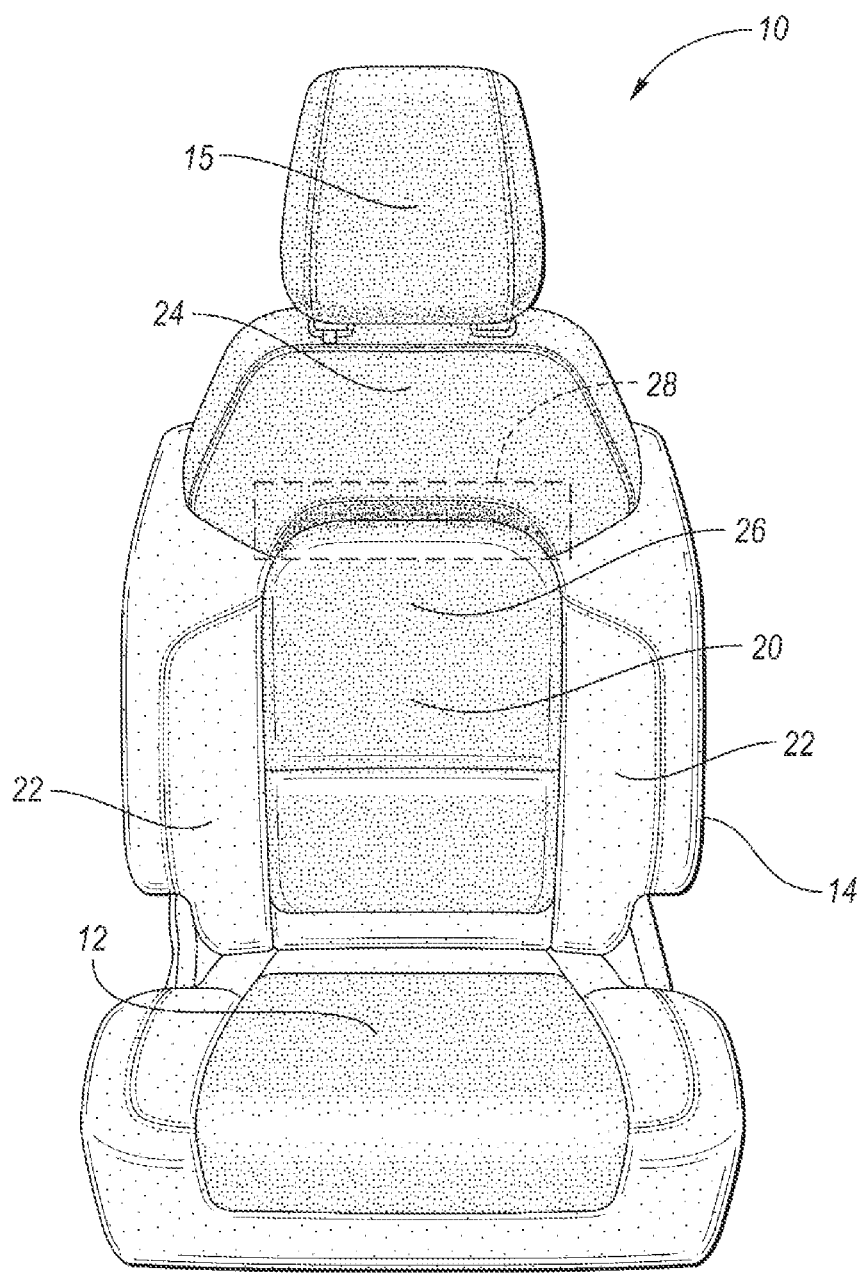
FIG. 1 illustrates a perspective front view of a vehicle seat assembly according to an embodiment.

Referring to FIG. 1, one embodiment of a seat assembly 10 is shown. While the vehicle seat assembly 10 is illustrated in FIG. 1 to be a bucket seat assembly, it should be understood that the principles of the present disclosure are applicable to other types of seat assemblies, such as bench, captain and other seat assemblies. It should also be understood that the principles of the present disclosure are applicable to other vehicle interior trim components such as seat bottoms, back support pads, armrests, and head restraints where aesthetic features may be desired. Still further, it should also be understood that the principles of this disclosure are applicable to all types of vehicle seat assemblies as well as non-vehicle seat assemblies, and discussion of a vehicle seat is not intended to be limiting. The seat assembly 10 can be configured for use in a vehicle, such as motor vehicle like a car or truck, or for use in non-vehicular applications. The seat assembly 10 includes a seat bottom 12 and a seat back 14 disposed on the seat bottom 12, and a headrest 15 attached to the seat back 14. The seat back 14 may be pivotally disposed on the seat bottom 12 to move in the forward and aft direction of the vehicle relative about a pivot point. The seat bottom 12 is mountable to a surface such as a vehicle floor. Although FIG. 1 shows a vehicle seat assembly with the headrest 15, seat assembly designs may be constructed without the headrest 15, or the headrest 15 may be removable attached or pivotably attached based on design considerations of the vehicle interior.

The seat bottom 12 and the seat back 14 each include one or more seat foam pads 18 supported on a seat frame 19 for forming the seat 10, as can be seen in FIGS. 2A-3C and will be discussed in further detail below. The seat foam pads 18 are disposed under a trim cover assembly 20. The trim cover assembly 20 provides an exterior seating surface, also known as the A-surface, which can be an occupant support surface for the seat 10. The trim cover assembly 20 includes a trim cover that is made of at least one suitable material, such as, but not limited to, leather, synthetic leather, vinyl, fabric, synthetic suede, non-woven fabric, or combinations thereof (fabric-to-fabric, leather-to-leather, fabric-to-leather, leather-to-fabric, etc.). Hereinafter, although the trim cover may be referred to as a leather trim cover or leather layer, it is understood that the material for the trim layer may be any suitable material, and leather is disclosed as a non-limiting example for the trim assembly described herein. It should be understood that the cushion 18 for the seat back 14 can differ from the cushion 18 of the seat bottom 12. Likewise, it should be understood that the trim cover assembly 20 for the seat back 14 can differ from the trim cover assembly 20 for the seat bottom 12. The trim cover assembly 20 can readily be useable in a heat/cool seat assembly 10, but may be equally useable with other types of seat assemblies, such as non-temperature controlled seat assemblies.

In at least one embodiment, as shown in FIG. 1, the trim cover assembly 20 comprises a plurality of trim cover panels that are secured together such that the trim cover assembly 20 has an opening at an end into which the seat bottom 12 or the seat back 14 may be inserted. More specifically, trim cover assembly 20 has a plurality of peripheral panels 22 that are stitched, or otherwise secured, together at seams. A top panel portion 24 and a central panel portion 26 are likewise stitched, or otherwise secured, to the peripheral trim panels 22 via stitching or seams. In at least one embodiment, all of the panels include at least an outer layer of leather. The trim cover assembly 20 can have other conventional members such as a thin foam layer (not shown) and trim attachments such that the peripheral portions 22 of the trim cover assembly 20 are attachable to the seat component(s) in any suitable manner, for example by attaching to the frame and/or cushion members.

Engagement of the features of the top panel portion 24 will be discussed in further detail with respect to FIGS. 2A-3C such that the top panel portion 24 and the central portion 26 cooperate to form a faux hole 28 in the seat back 14. The top panel portion 24 of the trim cover assembly 20 is secured to the seat frame in such a way to form the faux hole 28 on the A-side of the seat back 14 between the top panel portion 24 and the central panel portion 26. The central portion 26 may include a stiffener (not shown) disposed on the rear side of the trim forming the central portion 26 to define a top surface of the central portion 26 and the base of the faux hole 28. The faux hole 28 is an aesthetic feature of the seat back 14, which may look to an observer or vehicle occupant to be a through-hole in the seat back 14, however the faux hole 28 is formed through the seat pad and the back of the faux hole 28 is not exposed such that the faux hole 28 ends at the back panel (not shown) of the seat back 14. Although the faux hole 28 is shown as a horizontally elongated shape with some curvature, the faux hole 28 may have any suitable shape or dimensional sizing based on design considerations for the seatback (e.g., no curves, additional curves, convex geometry, and the like, and e.g., may have a width spanning the seatback, a portion of the seatback, etc.), and the depiction of this particular faux hole 28 is not intended to be limiting.

Figure 2A:
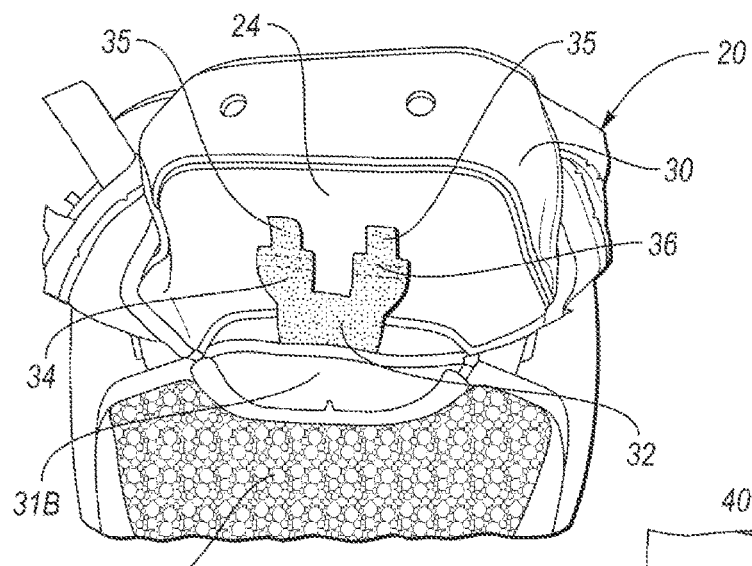
FIGS. 2A-D illustrate perspective views of various components of a vehicle seat assembly according to an embodiment.
Figure 2B:
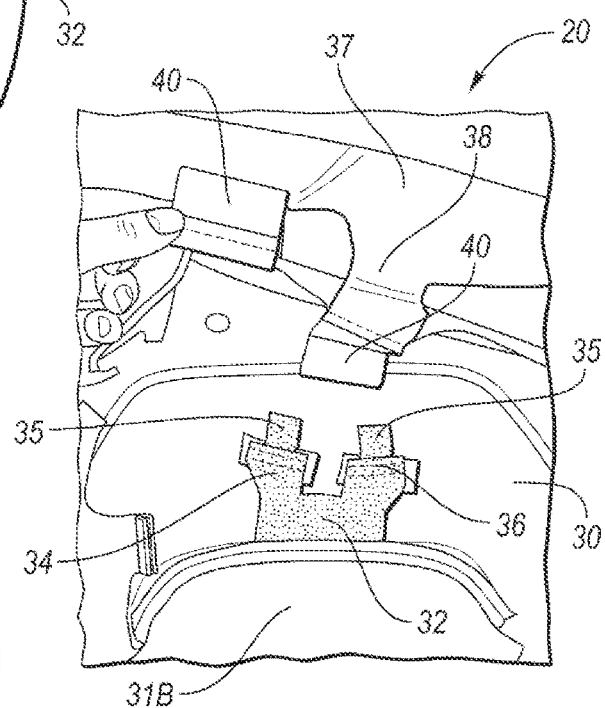
Figure 2C:
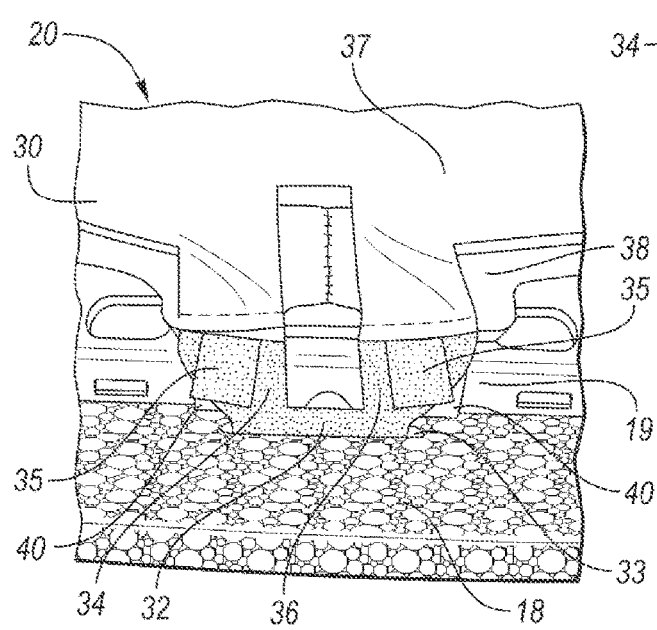

Referring to FIGS. 2A-B, a front view of the B-side of the top panel portion 24 of the trim cover assembly 20 is shown, according to an embodiment. The trim cover assembly 20 includes trim cover 30, and is shown forming the top panel portion 24, with a foam layer 31A and a liner layer 31B forming part of the central portion 26, which together form the B-side of the trim cover 30 that contacts the front of the foam pad 18 of the seat back 14. The A-side of the trim cover 30 forms the occupant support surface of the seat back 14. Although certain layers are shown for the trim cover assembly 20, any suitable layers may be included as based on the desired seat comfort and utility (e.g., heating, cooling, etc.). As such, the top panel portion 24 of the trim cover assembly 20 may include any suitable additional layers, such as foam, spacer, or other materials to form the top panel portion 24, provide support to the trim cover 30, and, in some embodiments, increase comfort for the vehicle occupant who contacts the A-side. For example, in some embodiments, the liner layer 31B may include a stiffener (not shown) on the B-side to better define the bottom surface of the faux hole 28, and in other embodiments, the liner layer 31B may include a central portion fastener (not shown) thereon to secure the liner layer 31B to the foam pad 18 to form the bottom of the faux hole 28. The trim cover 30 of the top panel portion 24 includes a flap portion 32, which is provided to feed through an opening 33 in the foam pad 18 of the seat back 14. The opening 33 may be a slit or have any suitable shape, geometry, and size for receiving the flap portion 32 therethrough and for forming the edge region of the faux hole 28. Although the opening 33 is shown in a single foam pad 18 of the seat back 14, the opening 33 may in some embodiments be formed between two separate foam pads forming the seat back 14. The flap portion 32 includes a fastener 35 thereon, such as either a hook fastener or a loop fastener. The fastener 35 may be secured to the flap portion 32 in any suitable manner, such as, for example, by sewing or by an adhesive. As can be seen in FIG. 2C, the flap portion 32 extends through the opening 33 in the foam pad 18. This allows for the A-surface of the trim cover 30 to form the top edge of the faux hole 28 by curving at the edge of the opening 33 and going through the opening 33 for attachment to the frame 19. The opening 33 in the foam pad 18 may be any suitable shape and size to accommodate the flap portion 32 therethrough without structurally altering the foam pad or its integrity in forming the support surface of the seatback. The opening 33 may range from, for example, 5 mm to 100 cm in size, as depending on the seat design and size, as well as aesthetic considerations for the faux hole 28. Furthermore, although only one faux hole 28 is shown in the Figures, additional faux holes are also contemplated. Each faux hole can be formed with a corresponding slit in a corresponding foam pad for the region where the faux hole is aesthetically desired. Furthermore, the trim cover 30 may be held in any suitable tension with respect to the frame 19 to form the top edge of the faux hole 28 by curving at the edge of the opening 33, and held according to the shape desired for the faux hole 28. Additionally, the trim cover 30 may have one color at one region of the seat back, and another color different from the first, at another region of the seat back, to enhance the aesthetic appearance of the faux hole 28.

In certain embodiments, as shown in FIGS. 2A-D, the flap portion 32 has a split design such that the flap portion 32 defines two discrete tabs 34, 36 with the fastener 35 on each of the tabs 34, 36. Although two tabs are shown in the Figures, it is contemplated that the flap portion 32 may have any suitable shape and any suitable number of tabs, and the depiction of the particular split design with two tabs is not intended to be limiting. For example, the flap portion 32 may be a single piece with the fastener 35, or define three or more tabs for securing the trim cover 30, or have any other suitable shape for supporting an attachment mechanism for securing the flap portion 32 to the trim cover 30 after passing through the opening 33. Furthermore, the flap portion 32 may have any suitable size as based on the opening 33 or the size of the faux hole 28, and thus, securing requirement for the trim cover 30.

Figure 2D:
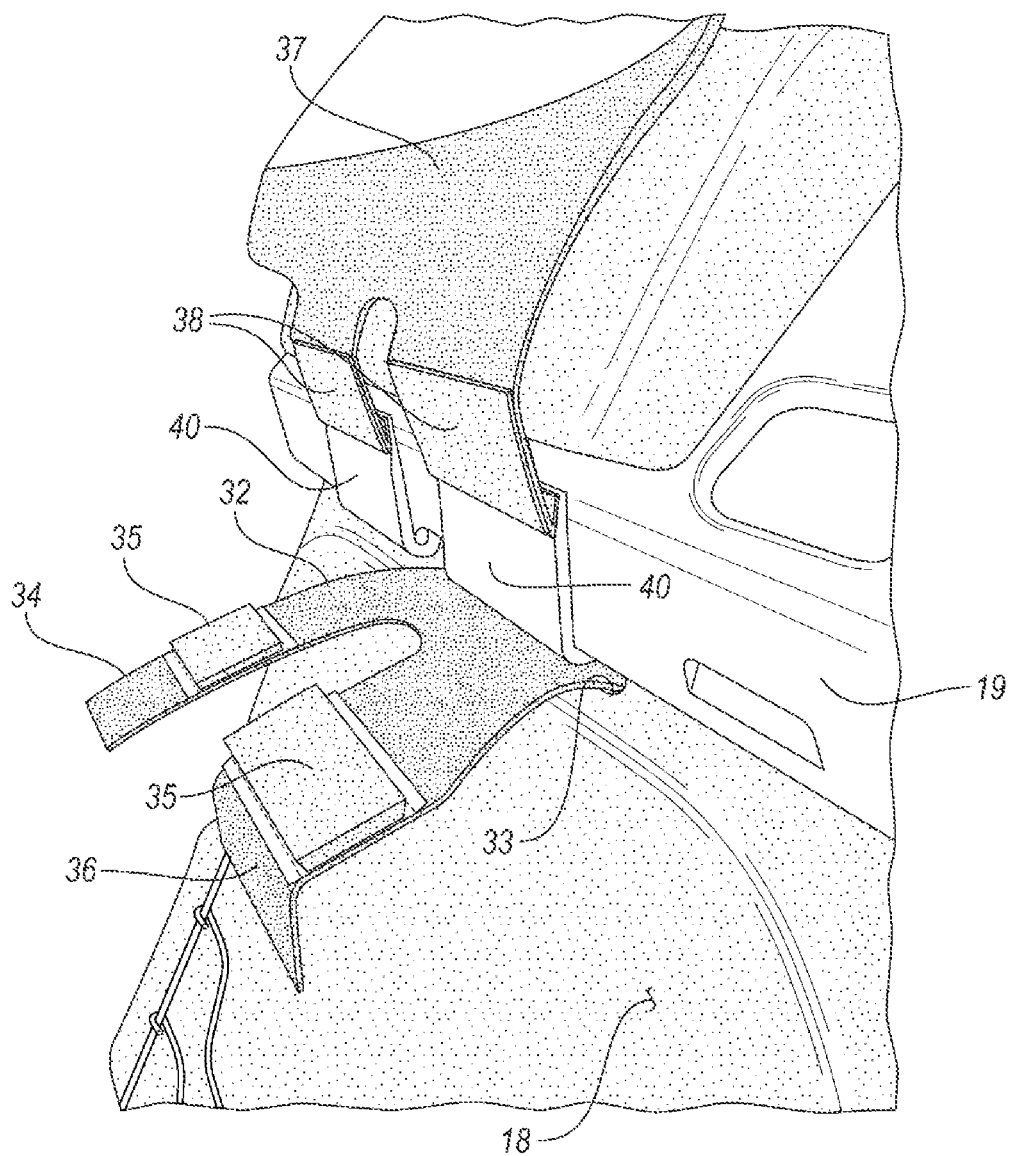

Referring to FIG. 2B-D, the trim cover 30 of the top panel portion 24 further includes a rear panel 37 on the rear side of the seat back 14 (not shown in FIG. 2A) that has at least one retainer 40 for securing the trim cover 30 to the seat frame 19 on the rear side of the seat back 14. In the embodiment shown in FIG. 2C, the retainer 40 is secured to the seat frame 19 via engagement with the seat frame 19, for example, via interference fit with the seat frame 19. The retainer 40 may have a clip side for securing to the seat frame 19, and a flat side opposite the hook side for engaging the trim cover 30. As such, the retainer 40 may be a J-retainer or other suitable fastener for attaching a trim cover to a seat frame. In one or more embodiments, as in the embodiment shown in the Figures the rear panel 37 may include two retainers 40, however, in other embodiments, the rear panel 37 may include any suitable number of retainers 40 to secure the trim cover 30 to the seat frame 19 as based on the design of the flap portion 32, e.g., one long retainer, or two or more discrete retainers. The at least one retainer 40 of the trim cover 30 is located on the rear side of the seat when compared to the A-surface and formation of the faux-hole, and configured to engage the seat frame 19 and hold the trim cover 30 on the seat frame 19.

Each retainer 40 includes a corresponding fastener 38 thereon to cooperate with fastener(s) 35 on the flap portion 32. As shown in FIG. 2D, the corresponding fastener 38 on the retainer 40 is rear-facing from the rear surface of the seat back 14, such that the fastener(s) 35 can be positioned thereon on the rear side of the seat back 14 to form the faux hole 28. In the embodiment shown in FIGS. 2B-D, each retainer 40 includes the respective fastener 38 for cooperating with the fasteners 35 of the flap portion 32 that is fed through the opening 33. The fastener 38 may be either a hook fastener or a loop fastener, as based on being cooperable with the fastener 35. In an embodiment, the flap portion 32 includes a hook fastener as fastener 35, and the retainer 40 includes a loop fastener as fastener 40. In another embodiment, the flap portion 32 includes a loop fastener as fastener 35, and the retainer 40 includes the hook fastener as fastener 40. The fastener 40 may be secured to the retainer 40 in any suitable manner, such as by sewing or by an adhesive. The fastener 38 may be included on a rear facing portion of the retainer 40 such that the flap portion 32 is attached to the rear facing portion of the retainer 40 to further secure the trim cover 30 to the seat frame 19 and provide a secure attachment to form the faux hole 28 in the A-surface.

Referring to FIGS. 2C-D, the rear panel 37 of the trim cover 30 is shown secured to the seat frame 19 via the retainers 40. Each retainer 40 includes a corresponding fastener 38 thereon. The flap portion 32 of the trim cover 30 passes through the opening 33 in the foam cushion 18 of the seat back 14. The fasteners 35 of the flap portion 32 are secured to the fasteners 38 to attach the trim cover assembly 20 to the seat frame 19 such that the faux hole 28 can be formed in the seat back 14 of the vehicle seat 10.

In certain embodiments, as shown in FIGS. 2A-D, the trim cover assembly 20 may be secured to the seat frame 19 as based on the construction of the close-out for the rear side of the seat back 14. For example, the embodiment shown in FIGS. 2A-D may receive a hard panel thereover during final assembly to cover the rear of the seat back 14. In other embodiments, with reference to FIGS. 3A-C, the close-out may be via a soft panel sewn over the rear of the seat back 14 (e.g., a seat back with a pocket design).

Figure 3A:
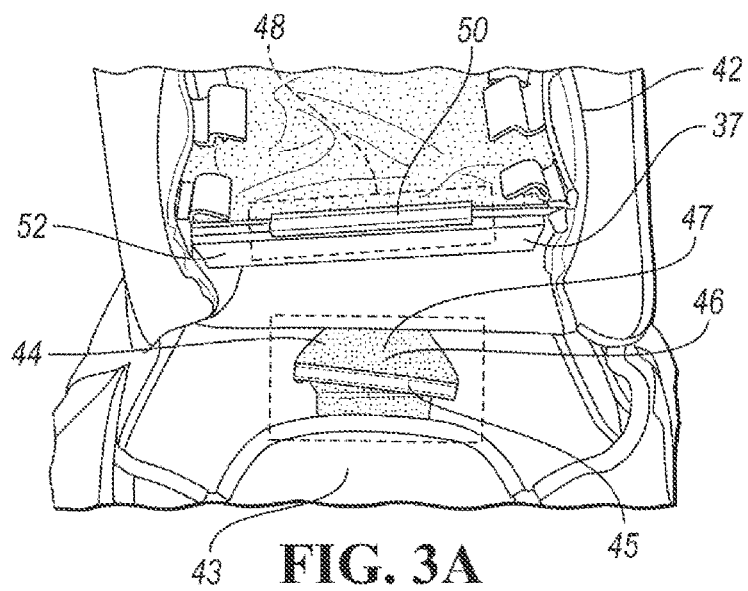
FIGS. 3A-C illustrate perspective views of various components of a vehicle seat assembly according to another embodiment.
Figure 3B:
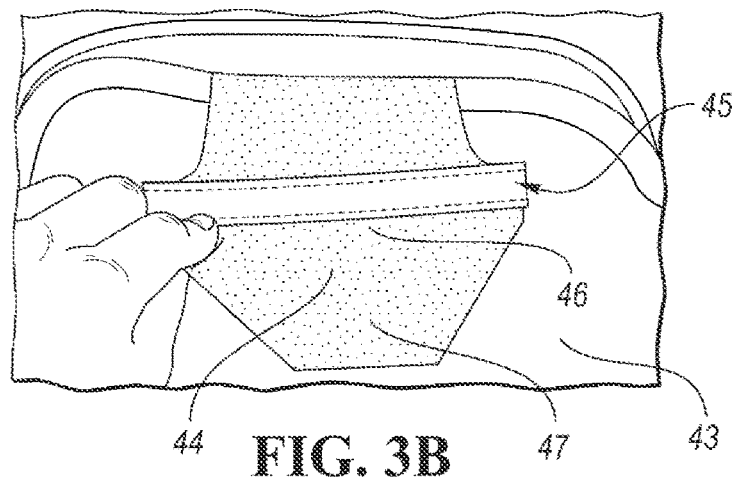
Figure 3C:
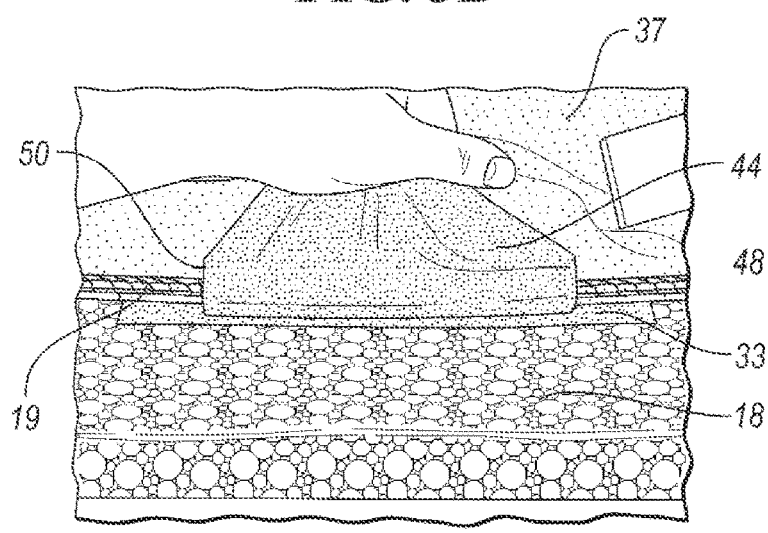

Referring to FIGS. 3A-C, the B-side of the top panel portion 24 of the trim cover assembly 20 is shown, according to another embodiment. The arrangement is shown for the attachment of the trim cover 30 of the trim cover assembly 20 with a soft back panel of the seat, however any back panel material is contemplated as previously described with reference to FIGS. 2A-C.

Similar reference numbers are used herein for similar components between embodiments, with the features of the embodiment shown in FIGS. 3A-C for forming the faux hole 28 having new reference numerals. The top panel portion 24 of the trim cover assembly 20 includes a trim cover 42. The top panel portion 24 of the trim cover assembly 20 may include any suitable number layers, such as foam, spacer, or other materials to form the trim cover 42, provide support to the trim cover 42, and increase comfort for the vehicle occupant who contacts the A-side. For example, the trim cover assembly 20 may include an inner liner layer 43 which contacts the foam pad 18. The trim cover 42 includes a flap portion 44, which is provided to feed through the foam pad 18 through an opening 33 in the foam pad 18 of the seat back 14. The opening 33 may have any suitable shape, geometry, and size for receiving the flap portion 44 therethrough and for forming the top edge of the faux hole 28. The flap portion 44 includes a fastener 45 thereon, such as either a hook fastener or a loop fastener. The fastener 45 may be secured to the flap portion 44 in any suitable manner, such as by sewing or by an adhesive. As can be seen in FIG. 3C, the flap portion 44 extends through the opening 33 in the foam pad 18 for forming the faux hole 28 by curving over the edge of the opening 33 and going through the opening 33. In certain embodiments, as shown in FIGS. 3A-C, the flap portion 44 has a trapezoidal shape with the fastener 45 on a wide portion 46 of the flap portion 44, with a narrow distal end 47 forming the leading edge to pull through the opening 33. Although a single shape is shown in the Figures, it is contemplated that the flap portion 44 may have any suitable shape and may include any suitable number of tabs, similar to the flap portion 32, and the depiction of the particular design is not intended to be limiting, nor is the position of the fastener 45 on the flap portion 44 intended to be limiting. For example, the fastener 45 may be located closer to the narrow distal end 47 than the wide end 46. Furthermore, the trim cover 42 may be held in any suitable tension with respect to the frame 19 to form the faux hole 28 by curving at the edge of the opening 33, and held according to the shape desired for the faux hole 28. Additionally, the trim cover 42 may have one color at one region of the seat back, and another color different from the first, at another region of the seat back, to enhance the aesthetic appearance of the faux hole 28.

Referring to FIG. 3B-C, the trim cover 42 of the top panel portion 24 of FIG. 3A further includes on a back side 54, a securing flap 48 for attaching the trim cover 42 to the seat frame 19. In the embodiment shown in FIG. 3B-C, the securing flap 48 is secured to the seat frame 19 via a retainer 52 having a fastener 50 thereon to engage with the flap portion 44. The retainer 52 thus may have a flat side facing away from the rear side of the seat back 14, and a clip part for engaging the seat frame 19. The trim cover 42 is secured via positioning the flap portion 44 through the opening 33 and onto the securing flap 48 for attachment via the fastener 50 and the fastener 45. As such, the retainer 52 may be a J-retainer or other suitable fastener for attaching a trim cover to a seat frame. In one or more embodiments, although in FIGS. 3A-C the seat back 14 shows a single retainer 52, the trim cover assembly 20 may include two or more retainers to secure the trim cover 42 to the seat frame 19 as based on the design of the trim cover and securing flap 48, and flap portion 44, e.g., one long retainer, or two or more discrete retainers. The securing flap 48 includes the fastener 50 thereon to cooperate with fastener(s) 45 on the flap portion 44. As shown in FIGS. 3B-C, the securing flap 48 includes a long strip of fastener 50 for cooperating with the fastener 45 of the flap portion 44. The fastener 50 may be either a hook fastener or a loop fastener, as based on being cooperable with the fastener 45. In an embodiment, the flap portion 44 includes a hook fastener as fastener 45, and the securing flap 48 includes a loop fastener as fastener 50. In another embodiment, the flap portion 44 includes a loop fastener as fastener 45, and the securing flap 48 includes the hook fastener as fastener 50. The fastener 50 may be secured to the securing flap 48 in any suitable manner, such as by sewing or by an adhesive. The fastener 50 may be included on the back side of the hook part of the retainer such that the flap portion 44 is engages the fastener 50 after being passed through the opening 33 to secure the trim cover 42 to the securing flap 48 which is engaged with the seat frame 19 to form the faux hole 28 in the A-surface on the front the seat back 14.

Referring to FIG. 3C, the securing flap 48 of the trim cover 42 is shown secured to the seat frame 19 (via retainer 52), according to the embodiment of FIGS. 3A-B, with the flap portion 44 secured onto the fastener 50 on the securing flap 48. The flap portion 44 of the trim cover 42 is fed through the opening 33 in the foam cushion 18 of the seat back 14. The trim cover 42 is secured to the the seat frame 19 via the retainer 52 on the securing flap 48, which includes the fastener 50 thereon. The fastener 45 of the flap portion 44 is secured to the fastener 50 to attach the trim cover assembly 20 to the seat frame 19 such that the faux hole 28 can be formed in the A-surface of the seat back 14 of the vehicle seat 10.

According to one or more embodiments, a vehicle seat assembly includes a trim cover assembly for securing a trim cover to a vehicle seat frame. The seat back includes a foam pad having a slit therethrough for receiving a flap portion of the trim cover such that the flap portion can be secured to a retainer via a fastener. The retainer secures the trim cover to the seat frame and engages the flap portion via fasteners such that a faux hole can be formed on the A-surface of the trim cover. The faux hole provides an aesthetic design to the vehicle seat, without being a complete pass through.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
   a seat frame including a frame component;
   a seat pad supported by the seat frame, the seat pad defining an opening therethrough such that the seat frame is accessible via the opening; and
   a trim cover assembly disposed over the seat pad, the trim cover assembly including a trim cover having:
      a flap portion sized to extend through the opening in the seat pad, the flap portion including a first fastener, and
      a securing flap having a retainer secured thereon, the securing flap including a second fastener cooperable with the first fastener,
   wherein the retainer is connected to the frame component to attach the securing flap to the seat frame, and the flap portion is positioned through the opening and connected to the securing flap via the first and second fasteners to define a faux hole in an occupant surface of the vehicle seat.

2. The vehicle seat of claim 1, wherein the first fastener and the second fastener are cooperable hook and loop fasteners.

3. The vehicle seat of claim 1, wherein the retainer is a J-retainer having a flat portion and a hook part defining a J-shape.

4. The vehicle seat of claim 3, wherein the second fastener is attached to a rear-facing side of the flat portion via the securing flap.

5. The vehicle seat of claim 1, wherein the second fastener is attached on an opposite side of the securing flap from the retainer.

6. The vehicle seat of claim 1, wherein the securing flap includes at least two retainers.

7. The vehicle seat of claim 6, wherein the flap portion includes at least two discrete tab portions for engaging a corresponding retainer of the securing flap.

8. A vehicle seat comprising:
   a seat frame including a frame component;
   a seat pad supported by the seat frame, the seat pad defining an opening therethrough such that the seat frame is accessible via the opening; and
   a trim cover assembly disposed over the seat pad, the trim cover assembly including a trim cover having:
      a flap portion including a first fastener disposed thereon and positioned through the opening in the seat pad,
      a securing flap including a second fastener cooperable with the first fastener, and
      a retainer attached to the securing flap,
   wherein the retainer connects the securing flap to the frame component, and the flap portion is positioned through the opening and secured to the securing flap via the first and second fasteners to define a faux hole in an occupant surface of the vehicle seat.

9. The vehicle seat of claim 8, wherein the first fastener and the second fastener are cooperable hook and loop fasteners.

10. The vehicle seat of claim 8, wherein the retainer is a J-retainer having a flat portion and a hook part defining a J-shape.

11. The vehicle seat of claim 10, wherein the second fastener is attached to the flat portion on a side of the securing flap facing away from a rear side of the vehicle seat.

12. The vehicle seat of claim 8, wherein the flap portion includes a first portion and second distal portion, the first portion being wider than the second portion, and the first fastener is positioned on the first portion.

13. The vehicle seat of claim 8, wherein the flap portion has a trapezoidal shape.

14. The vehicle seat of claim 8, wherein the securing flap includes a plurality of retainers.

15. The vehicle seat of claim 14, wherein the flap portion includes a plurality of first fasteners, with each first fastener corresponding to a second respective fastener positioned on the securing flap corresponding to each of the plurality of retainers.

16. A vehicle seat assembly comprising:
   a seat frame including a frame component;
   a seat pad supported by the seat frame, the seat pad defining an opening therethrough such that the seat frame is accessible via the opening; and
   a trim cover assembly disposed over the seat pad, the trim cover assembly including
      a flap portion sized to fit through the opening in the seat pad and including a first fastener on the flap portion, and
      a securing flap having a retainer on a first side, and a second fastener on an opposite side from the first side of the securing flap, the second fastener being cooperable with the first fastener, wherein the retainer is engaged with the frame component to connect the securing flap to the seat frame, and the flap portion is positioned through the opening and secured to the securing flap via the first and second fasteners to define a faux hole in an occupant surface of a vehicle seat.

17. The vehicle seat assembly of claim 16, wherein the first fastener and the second fastener are cooperable pairs of hook and loop fasteners.

18. The vehicle seat assembly of claim 16, wherein the retainer is a J-retainer, with the retainer having a flat portion and a clip part defining a J-shape, and the second fastener is attached on a rear facing side of the securing flap at the flat portion.

19. The vehicle seat assembly of claim 16, wherein the flap portion includes a first portion and second distal portion, the first portion being wider than the second portion, with the first fastener positioned on the first portion.

20. The vehicle seat assembly of claim 16, wherein the flap portion includes at least two tab portions for engaging respective tab portions defined on the securing flap.

\* \* \* \* \*